June 25, 1957  F. MÜLLER  2,797,077
APPARATUS FOR PREHEATING KILN-FEED MATERIAL BY KILN-EXIT GASES
Filed Aug. 2, 1955  2 Sheets-Sheet 2

United States Patent Office 2,797,077
Patented June 25, 1957

2,797,077
APPARATUS FOR PREHEATING KILN-FEED MATERIAL BY KILN-EXIT GASES

Franz Müller, Refrath, Bezirk Koln, Germany, assignor to Klöckner-Humboldt-Deutz Aktiengesellschaft, Koln-Deutz, Germany, a corporation of Germany Application August 2, 1955, Serial No. 526,008

Claims priority, application Germany August 7, 1954

5 Claims. (Cl. 263—32)

The invention relates to apparatus for the preheating of pulverulent kiln-feed material by heat exchange with the hot exit gases of the kiln to which the material is being supplied. More particularly, the invention relates to the preheating raw cement material generally by the method and with the aid of apparatus of the kind known from Patents 2,648,532 and 2,663,560 of F. Müller et al., assigned to the assignee of the present invention.

The preheating apparatus according to these patents comprise a number of serially interconnected dust-from-gas separators which are traversed by exit gases of a rotary kiln in a continuous, forced flow maintained by means of a blower. The gas conduits interconnecting the separators consist of wide pipes of circular cross section. The gas inlet conduit of the first, kiln-adjacent separator receives the exit gases from the rotary kiln. The gas outlet conduit of this first separator forms the inlet conduit for the second separator which is located at a higher elevation than the first separator. Similarly, a gas conduit extends from the second separator to the next higher, third separator and so forth, depending upon the number of separators in the series. The kiln-feed material is supplied into the gas conduit leading to the last, uppermost separator of the series so as to be gas-conveyed into that separator. The dust discharge pipe of this separator gravity-conveys the separated material into the gas conduit ahead of the next lower separator, whence the material is gas-conveyed into the latter separator whose dust discharge pipe passes the material into the gas conduit ahead of the preceding separator, and so forth as the case may be, except that the dust discharge pipe of the first or lowermost separator is connected with the kiln to supply it with the preheated material.

In the operation of such preheating apparatus it has been found that, depending upon the origin or composition of the raw material, some amount of material may bake to the inner wall of the gas conduits between the separators, especially in the lower portions of heat exchanging systems where the temperature of the material approaches the calcining range. This makes it necessary to clean the gas conduits from time to time. To permit such cleaning, the conduits may be provided with normally covered clean-out openings of sufficiently large size as conventionally used for such purposes. However, the cleaning afforded by such openings remains a difficult matter and necessitates temporarily stopping the operation of the kiln.

It is an object of the invention to minimize such difficulties and to devise a preheating apparatus of the above-mentioned kind that can more readily be cleaned from deposits of material occurring on the conduit walls and does not require interrupting the kiln operation.

To this end, and in accordance with the invention, the gas conduits interconnecting the separators in preheating apparatus of the kind mentioned are given a rectangular inner cross-section, preferably of square shape; and each of the four walls of one or more of these conduits is provided with rows of normally covered holes which are spaced from one another along an edge of the wall and located in proximity to the adjacent wall, the size of each hole being small compared with the width of the conduit.

In preheating apparatus thus equipped, each hole in the wall of a gas conduit permits the insertion of a scraping tool or rod parallel and close to the inner surface of one of the conduit walls so that a substantially triangular area, having its apex at the hole, can be scraped by manipulating the tool from the outside of the conduit. Besides, due to the rectangular shape of the conduit cross-section, any deposits or incrustations in the triangular area can be scraped off more readily than in conduits of circular cross-section where such deposits are braced by their circular shape and are less accessible by a tool operated from the outside of the conduit.

According to another feature of the invention, the mutual spacing of the holes in each row, in general, is approximately equal to the base of the triangular area above-mentioned, and the holes of each row are longitudinally displaced relative to those of the row located in the opposite wall of the conduit so that the triangular areas of accessibility are contiguous or overlapping, thus permitting the cleaning of the entire inner conduit surface with a minimum of holes.

While other features of the invention, all set forth with particularity in the claims annexed hereto, will be apparent from illustrated embodiment described below, it may be mentioned at this place that due to the small diameter of the holes the cleaning operation can be performed during the operation of the preheater apparatus, and that it is not necessary to provide any additional means for removing any scraped off deposits as these are automatically entrained by the forceful and voluminous flow of kiln gases and thus reach the next following separator which separates them from the gas flow. Any course and heavier scrapings may drop into the preceding separator of the series whence they can readily be removed, if necessary.

Figure 1:
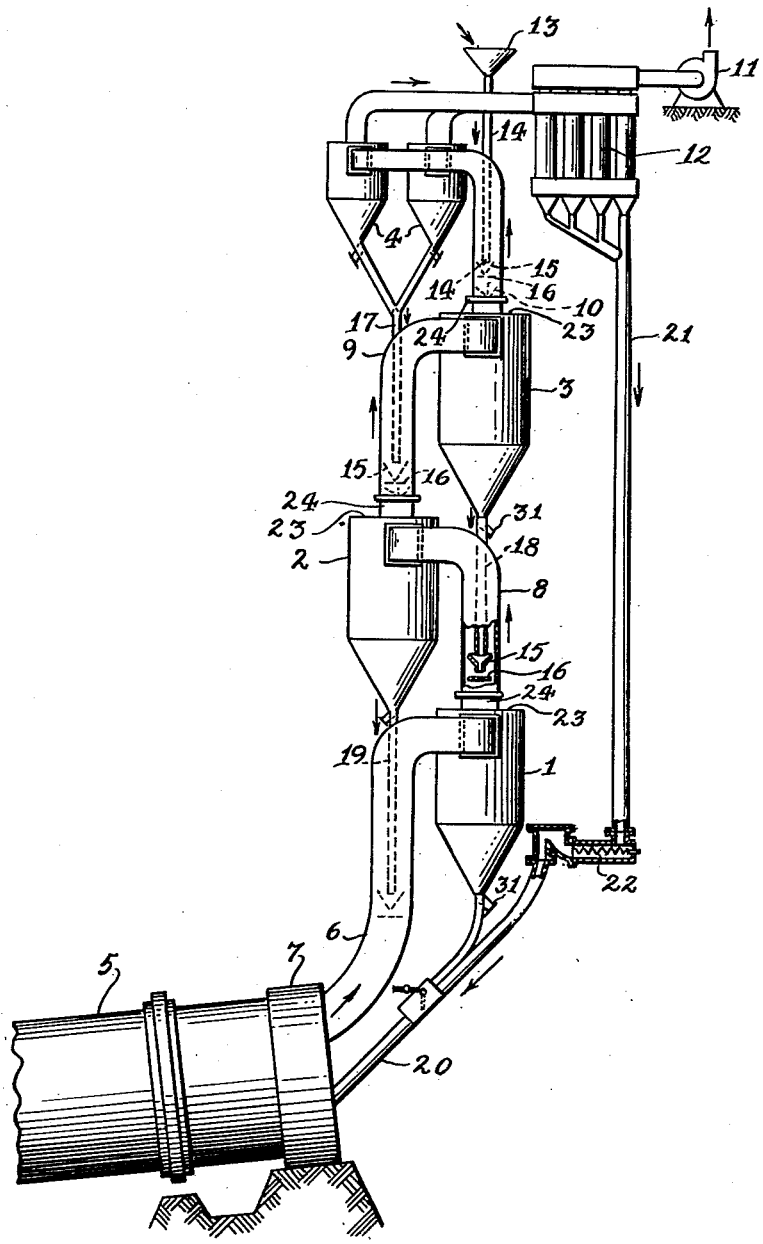
Fig. 1 shows schematically and by way of example a preheating apparatus according to the invention as applied to a rotary cement kiln.

The preheating apparatus shown in Fig. 1 is similar to the one more fully illustrated and described in the above-mentioned Patent 2,663,560. The apparatus comprises a group of heat exchangers 1, 2, 3 and 4 connected to a rotary cement kiln 5. Each heat exchanger consists of a centrifugal gas flow separator (cyclone) to which the gas is supplied tangentially and thus is caused to rotate before leaving the separator vessel. The cyclone 4 is composed of two parallel components. The cyclone 1 is connected through a gas conduit 6 with the stationary hood 7 of the rotary kiln. The hot exit gases from the kiln pass through conduit 6 into the cyclone 1 and thence successively through gas conduit 8, cyclone 2, gas conduit 9, cyclone 3, gas conduit 10 and cyclone 4. The gases are exhausted by a blower 11 through a dust collector 12 located at the end of the gas flow path. The collector 12 comprises several cyclone components of small diameter.

The pulverulent cement raw material is supplied through a hopper 13 whence it passes through a supply pipe 14 into the gas conduit 10 leading from cyclone 3 to the last cyclone 4 of the series. The supply pipe 14 extends axially within the gas conduit 10 along an appreciable portion of this conduit so that the discharge end of the supply pipe is close to the top of cyclone 3.

An upwardly flaring funnel structure 15 is mounted below the opening of supply pipe 14. The funnel 15 has an opening at its bottom, and a disc 16 is disposed below this opening in spaced relation thereto. During operation the raw material passing through pipe 14 into funnel 15 keeps the funnel space filled because the bottom opening of the funnel is relatively small. Consequently, the material flows mainly over the circular edge of the funnel, while only a small amount of material passes through the funnel opening to pass over the circular rim of disc 16. The funnel space thus forms a gas trap which prevents the ascending gas from entering into the supply pipe 14. The dust material passing over the top edge of funnel 15 and over the rim of disc 16 and is entrained by the forceful upward flow of kiln gases.

The material thus enters into the separator 4 where it is centrifugally separated from the gas flow. The separated material drains by gravity through the dust discharge pipe 17 of separator 4 onto the funnel structure 11 located in the gas conduit 9 and operating in the same manner as described above with reference to the funnel structure 11 in gas conduit 10. In conduit 9 the preheated raw material is again entrained by the upward flow of gases and enters into the cyclone 3. The material separated from the gas within separator 3 passes through the dust discharge pipe 18 of this separator into the conduit 8 whence it is entrained by the flow of gases into the separator 2. Then the material passes through the dust discharge pipe 19 of separator 2 into the gas conduit 6, thence into the separator 1 from which the fully preheated material passes through a dust collecting pipe 20 into the kiln. The material separated in the dust collector 12 passes through a dust discharge pipe 21 and a screw-conveyer trap 22 into pipe 20 and into the kiln.

It will be apparent that the path of feed material, though generally downward in opposition to the upward flow of hot kiln gases, follows a zig-zag course which meanders between the two separator columns, the material being alternately conveyed downwardly by gravity in the dust discharge pipes of the individual separators and upwardly by entrainment in the forced flow of hot gases. As the material thus descends from the hopper 13 through the preheating apparatus into the kiln it is effectively heated by heat exchange with the kiln gases. This heat exchange occurs predominantly within the cyclones 1, 2, 3 and 4. The material passing through the intermediate conduits gradually assumes such a high temperature that there exists the danger of heated material baking to the inside of the connecting conduits particularly in the lower, high-temperature portion of the apparatus.

Figure 2:
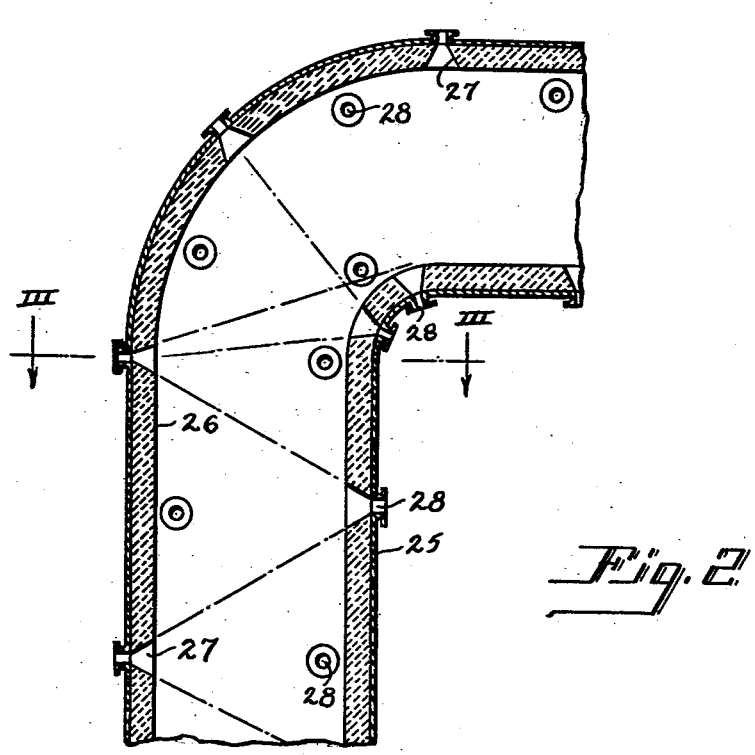
Fig. 2 shows, on a larger scale, one of the gas conduits of the same apparatus.
Figure 3:
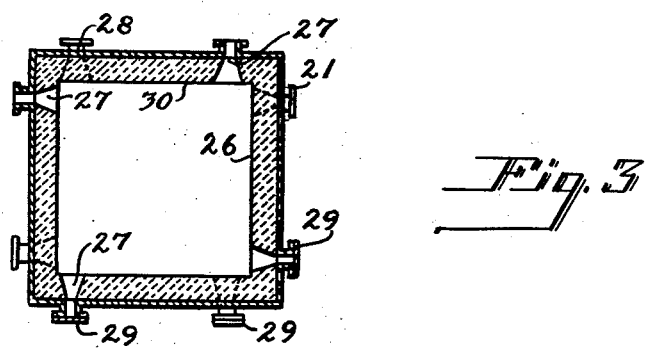
Fig. 3 is a cross-section of the gas conduit along the line III—III in Fig. 2.

As illustrated in Figs. 2 and 3, the gas conduits 6, 8, 9 and 10, according to the invention, are given a rectangular, preferably square-shaped cross-section. The transition between the circular gas outlet opening in the top walls 23 of the respective cyclones 1, 2 and 3 to the square cross-sectional shape of the gas conduits is effected by means of inserted cylindrical pipe sections 24 of short length. The refractory lining or masonry within the upper ends of these pipe sections is so shaped that the circular cross-section gradually widens and merges into the square cross-section of the respective conduits 8, 9 and 10.

Each gas conduit has a metal shell 25 and a refractory lining 26. Each of the four walls of the gas conduits is provided with two rows of holes 27 and 28, preferably, and as shown, each row of holes is located along an edge of the conduit wall in the proximity of the inner surface of the adjacent conduit wall. Each hole, preferably, has a circular cross-section and is so shaped that it widens conically through the insulating lining toward the interior of the conduit. Normally, each hole is closed by a cover 29 which can readily be removed from the outside.

Each conduit can be cleaned during the operation of the heat exchanging apparatus. For this purpose any one of the covers can be removed at a time. Then a cleaning or scraping rod or the like rod-shaped tool is inserted through the opening. Due to the conical shape of the opening the cleaning tool can be manipulated from the outside so that a substantially triangular area on the inner surface of the adjacent conduit wall can be swept or scraped in order to remove any adhering depositions of material.

The triangular areas of accessibility are indicated in Fig. 2 by dot-and-dash lines. For instance, any point of the wall surface 30 (Fig. 3) is accessible through the adjacent openings 27 and 28. The spacing between consecutive holes of each row is preferably so chosen that each triangular area, for instance relative to the holes 28, is symmetrical to the center line of that hole and the base line of the triangle is located between two holes 27 of the opposite row in the opposite wall of the conduit. Consequently each triangle related to the respective holes 28 is contiguous with, or somewhat over-lapped by, two adjacent triangles of accessibility through respective holes 27. In this manner all interior surfaces of the gas conduits are subdivided and can be liberated one by one from any deposits of material.

In the particular embodiment illustrated, the gas conduits are elbow-shaped and extend from the gas outlet of one separator (or from the kiln) upward and thence horizontally to the gas inlet opening of the next higher separator. As shown in Fig. 2, the curved portion of the elbow is likewise provided with holes. However, the spacing between the holes in the curved region of the elbow-shaped conduits is generally kept shorter so that in this region the triangular areas appreciably overlap each other in order to facilitate cleaning this region.

It will be recognized that the particles of material removed from the inner surface of the gas conduit are either entrained by the vigorous flow of gases to pass into the next higher cyclone where the particles are separated from the gas flow, or if the particles are coarse and heavy they fall directly into the next lower cyclone or into the rotary kiln. Any particle thus passing into the separators and being too heavy to be entrained by the gas flow can readily be removed through the large cleaning openings provided at the lower end of each cyclone as schematically indicated at 31.

While the invention has been described and illustrated with particular reference to a preferred embodiment of apparatus for the preheating of cement raw material entering into a rotary kiln, it will be understood by those skilled in the art, upon a study of this disclosure, that the invention is not limited to cement manufacture or to rotary kilns, but is also applicable for other purposes involving similar conditions, and that the details of the apparatus may be modified in various ways without departing from the essence of the invention and within the scope of the claims annexed hereto.

I claim:

1. Apparatus for the preheating of kiln-feed material by hot kiln-exit gases, comprising serially arranged dust-from-gas separators each having an inlet for dust-laden gas and a gas outlet and a dust discharge pipe, a gas conduit connecting the gas outlet of one of said separators with the inlet of the next separator and forming together with said separators a continuous gas path for the kiln-exit gases, gas impeller means forming part of said path for maintaining a forced draft of said gases through said path, the dust discharge pipe of said next separator extending into said gas path at a point ahead of said gas inlet of said one separator, said separators and dust discharge pipes forming together a dust path having a kiln-remote inlet for cold feed material and a kiln-adjacent exit for heated dust material, said gas conduit having a completely open and substantially rectangular inner cross-section so as to form four walls, each of said four walls having two rows of normally closed openings of small size as compared with the width of the conduit, said rows of holes in each wall extending along the conduit in proximity to the two respective edges of said wall to permit inserting through each opening a cleaning tool into the conduit for scraping a triangular area on the inside of the one other conduit wall that is adjacent to said opening, said holes in each row being displaced along the conduit relative to the holes of the opposite row in the opposite wall of the conduit, whereby substantially the entire inner conduit surface is accessible for cleaning from the outside.

2. Apparatus for the preheating of kiln-feed material by hot kiln exit gases, comprising a series of gas-from-dust separators and gas conduits interconnecting said separators and forming together therewith a continuous gas path for the kiln exit gases, means for maintaining a forced draft through said gas path, feed-material supply means communicating with said gas path in the conduit ahead of the last separator of the series, each of said separators having a dust discharge pipe communicating with said gas path at a point ahead of the next separator with the exception of the dust discharge pipe of the first separator of the series which latter pipe has a discharge opening for issuing the preheated material, at least one of said gas conduits having a completely open and substantially rectangular inner cross-section so as to form four walls, each of said four walls having two rows of holes of small size as compared with the width of the conduit and each having a removable cover, said two rows extending substantially over the entire length of said conduit and along the longitudinal edges of the conduit in proximity to the respective two adjacent walls whereby each hole permits inserting a cleaning tool and scraping a triangular area on the inside of said adjacent wall, the holes in each row being longitudinally displaced relative to the holes of the one row located near the same adjacent wall on the opposite side of the conduit, and the spacing between each two holes within each row being approximately equal to the phase of the triangular area.

3. In apparatus according to claim 1, said conduit having an outer metal shell and an insulating refractory lining, said openings extending through said shell and said lining and having in said lining an inwardly widening, substantially frusto-conical shape.

4. In apparatus according to claim 1, said one separator being located at a lower height than said next separator, said gas conduit having elbow shape and extending vertically upward from said gas outlet of said one separator and thence horizontally to said gas inlet of said next separator, so as to have two straight portions and an intermediate curved portion, the spacing between each two holes of the same row in said respective straight portions being approximately equal to the base of said triangular area, and the holes of each row located in said curved portion at the inside of the elbow shape being spaced from each other a distance shorter than said base.

5. Apparatus for the preheating of kiln-feed material by hot kiln exit gases, comprising a series of gas-from-dust separators and gas conduits interconnecting said separators and forming together therewith a continuous gas path for the kiln exit gases, means for maintaining a forced draft through said gas path, feed-material supply means communicating with said gas path in the conduit ahead of the last separator of the series, each of said separators having a dust discharge pipe communicating with said gas path at a point ahead of the next separator with the exception of the dust discharge pipe of the first separator of the series which latter pipe has a discharge opening for issuing the preheated material, said conduits having a square inner cross-section so as to form four walls, each of said four walls having two rows of normally covered holes of small size as compared with the width of the conduit, said two rows extending along the longitudinal edges of said wall in proximity to the respective two adjacent walls whereby each hole permits inserting a cleaning tool and scraping a triangular area on the inside of said adjacent wall, the spacing between each two holes within each row being approximately equal to the base of the triangular area and larger than the side length of said inner cross section, and the holes of each row being displaced by approximately one-half of said spacing relative to the holes of the opposite row.

References Cited in the file of this patent

UNITED STATES PATENTS

| | | |
|---|---|---|
| 1,583,436 | Atkinson | May 4, 1926 |
| 2,176,674 | Lindemuth | Oct. 17, 1939 |
| 2,559,350 | Drake | July 3, 1951 |
| 2,648,532 | Muller et al. | Aug. 11, 1953 |